United States Patent
Strack

[15] 3,653,739
[45] Apr. 4, 1972

[54] LEACHABLE BUNDLE OF OPTICAL FIBERS

[72] Inventor: Richard R. Strack, Sturbridge, Mass.
[73] Assignee: American Optical Corporation, Southbridge, Mass.
[22] Filed: July 2, 1970
[21] Appl. No.: 51,784

[52] U.S. Cl. ................................350/96 B, 65/4, 65/DIG. 7
[51] Int. Cl. ............................................................G02b 5/14
[58] Field of Search ........................350/96 B; 65/4, DIG. 7

[56] References Cited

FOREIGN PATENTS OR APPLICATIONS 1,111,419  4/1968  Great Britain.......................350/96 B

*Primary Examiner*—David Schonberg
*Assistant Examiner*—Robert L. Sherman
*Attorney*—William C. Nealon, Noble S. Williams and Robert J. Bird

[57] ABSTRACT

A plurality of optical fibers each having a core of high refractive index light-transmitting material, a cladding of lower refractive index material and a number of longitudinal acid-soluble rods fused to the exterior of the cladding are formed into a bundle with the rods spacing the fibers apart and leaving voids between them. The bundle is elongated by drawing and the drawn bundle having voids between its fibers is potted at each end with an acid resistant material whereupon it is leached to remove lengths of the rods between the end coatings for producing a flexible image-transmitting conduit.

4 Claims, 6 Drawing Figures

INVENTOR
Richard R. Strack
By Noble S. Williams
Attorney

3,653,739

LEACHABLE BUNDLE OF OPTICAL FIBERS

BACKGROUND OF THE INVENTION

1. Field of the Invention

Fiber optics with particular reference to flexible fiber optical image transporting devices and method of making the same.

2. Description of the Product

One of the known methods of producing a leached flexible image transporting conduit, i.e. a fiberscope, has required applying an acid-leachable glass as a second cladding completely around the optical cladding of each fiber. In the subsequent drawing of bundles of such double clad fibers, gaps between the fibers were nearly completely eliminated so that leaching had to take place radially of the monofibers rather than both radially and axially along the conduit. This resulted in lengthy etching times and the formation of conical unetched portions adjacent the transitional zones between the potted and uncovered sections of the conduit. These conical portions have the effect of weakening the finished conduit.

In conventional image conduits, a core glass which is hard relative to the cladding results in better blemish quality. This is partially because entrapped air and gases tend to form bubbles which grow into the softer material, i.e. the cladding. This results in less light loss and therefore better blemish quality than would result from growth into the fiber core material. In the case where clad fibers are tightly circumferentially joined in side-by-side relationships, however, a bubble growing into the soften cladding of one fiber will push the cladding of an adjacent fiber into the core of the adjacent fiber. This, in producing an irregularity in the core-cladding interface of the adjacent fiber renders this fiber and the conduit as a whole both inferior in their light-conducting capabilities.

SUMMARY OF THE INVENTION

In the method of the present invention there is provided clad fibers which are each provided with at least three acid-soluble rods secured in equispaced relation around the outside of the fiber cladding. When assembled in a bundle and drawn to form a conduit, the claddings of adjacent fibers are not touching each other and space is provided therebetween wherein leaching can take place longitudinally as well as radially of the conduit. The acid-soluble glass rods along sides of the fibers form air spaces between the fibers which receive distended portions of the fiber claddings produced by bubble formations and, for the most part in each case, prevent these cladding distensions from interferring with adjacent fibers.

Included among the objects and advantages of the present invention is a method for producing an improved optical fiber conduit.

Another object of the invention is to provide a method of producing a leachable conduit which prevents the formation of interfering air and/or gas bubbles between fibers of the bundle.

A further object of the invention is to provide a method of forming an improved flexible fiber optic device (fiberscope) having substantially reduced blemishes on fibers of the conduit.

A still further object of the invention is to provide a method of producing a leached optical fiber conduit with greater than usual resistance to fiber breakage in the transition zone between the separated fibers and secured together ends thereof.

These and other objects and advantages of the invention may be readily ascertained by referring to the following description and appended illustration in which:

DESCRIPTION OF THE PREFERRED EMBODIMENT

Figure 1:
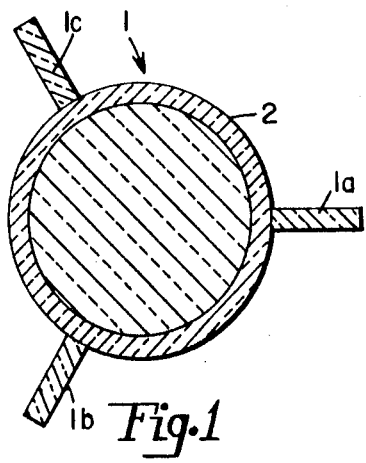
FIG. 1 is a cross-sectional view of one form of a clad optical fiber useful in accordance with the present invention.

In the embodiment of the invention shown in FIG. 1, a fiber 3 has cladding 2 and acid-soluble glass rods 1a, 1b, and 1c fused to the cladding. The purpose of the cladding is to produce an internally reflective interface along fiber 3 which will render the fiber conductive to light by the principles of total internal reflection. A plurality of such fibers bundled together will form an optical conduit which may be used to channel light along an irregular path. To obtain an intelligible light pattern (i.e. an optical image of an object) at the emitting end of such a conduit, the fibers at the egress end of the conduit must have the same relative geometrical relationship with each other as the fibers at the ingress end of the bundle.

A bundle of clad fibers requiring heating and drawing to reduced sizes and intended for use as a flexible fiberscope, must have a material between the fibers which may be subsequently removed from intermediate portions of the length of the drawn assembly to permit it to flex. Acid-soluble glass is generally used; and in this invention the acid-soluble glass is applied as rods to the exterior of the cladding of each fiber. After the drawing operation, the cooled bundle, with protected ends is immersed in an acid bath so that the acid leaches away the acid-soluble glass.

Figure 4:
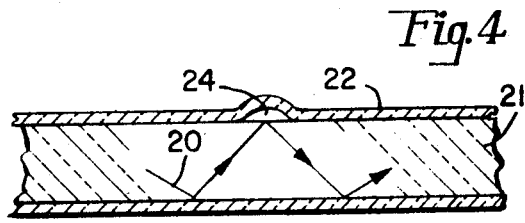
FIG. 4 is a greatly enlarged longitudinal cross-sectional view of an optical fiber wherein a blemish in the cladding of the fiber and the effect of the blemish on a light ray passing therethrough is illustrated.
Figure 5:
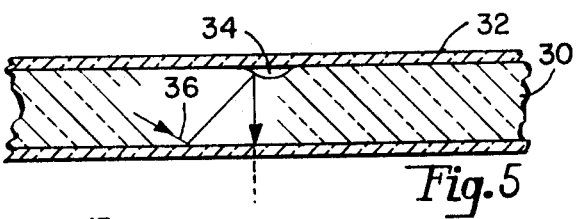
FIG. 5 is a greatly enlarged longitudinal cross-sectional view of an optical fiber wherein the effect of a blemish which extends into the core of a clad fiber is illustrated.
Figure 6:
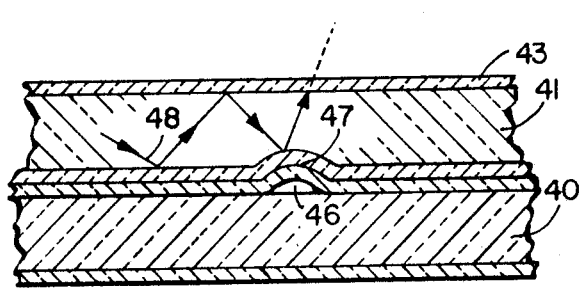
FIG. 6 is a greatly enlarged longitudinal cross-sectional view of a pair of juxtaposed fibers wherein there is illustrated the effect of a blemish on one fiber pushing into the other fiber and the reason for loss of light occurring at the blemish site.

Heretofore, the use of a complete coating of acid-soluble glass around fiber claddings caused an entrapment of air and/or the production of gases between the fiber glasses which tended to form air bubbles in the bundle. The effect of such bubbles on a clad fiber is illustrated in FIGS. 4–6. Since bubbles tend to form in the softer of the fiber core and cladding materials, it is preferable that the fiber claddings be fabricated of softer passes than the cores for better blemish quality. In this respect, it can be seen in FIG. 4 that a ray of light 20 which would ordinarily be conducted by total internal reflection through the fiber core 21 is generally unaffected by a bubble 24 in the cladding 22 since the resulting air-to-core glass interface is substantially the equivalent of the cladding 22-to-core-21 interface. Accordingly, with a large amount of space being provided between fibers of a bundle thereof into which portions of claddings distended by air and gas bubbles may protrude without affecting adjacent fibers according to principles of this invention, improved image transmission (better blemish quality) is achieved.

Bubbles which form in fiber cores, however, severely reduce the transmission of light through the fibers and/or bundles thereof. As shown in FIG. 5, a bubble 34 which has grown into the core 30 of a fiber having cladding 32 causes a ray of light 36 impinging on the bubble 34 to deflect from its normal path and become lost as stray light. In cases where a bubble 46 pushes the cladding 42 of one fiber 40 into the cladding 43 of the adjacent fiber 41, as is shown in FIG. 6, the deformed portion of cladding 43 forms an irregular surface at the core/clad interface of the upper fiber which adversely affects the light-conducting properties of fiber 41 in a manner similar to the effect of light loss in fiber 30 of FIG. 5. In this connection a ray 48 of light reflected from surface 47 would tend to become lost as stray light.

The present invention overcomes the air bubble formation difficulties by spacing of the fibers and also provides for improved acid leaching of a drawn bundle of fibers.

Figure 2:
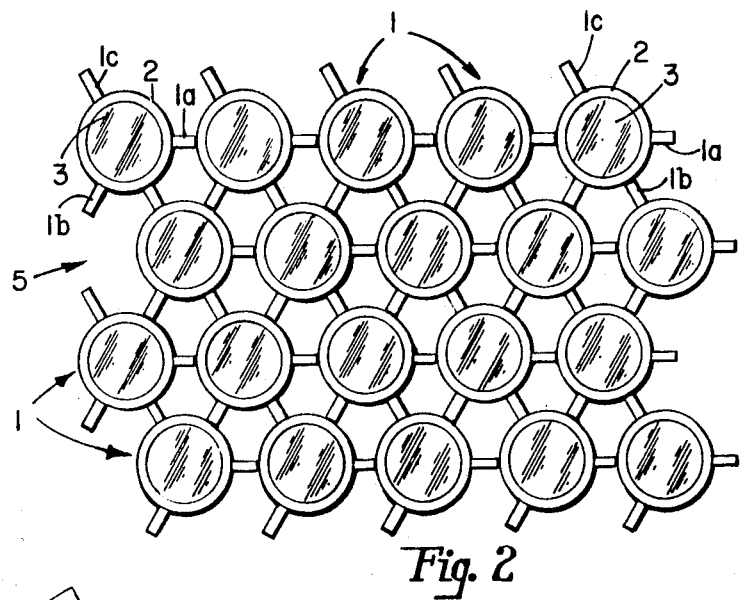
FIG. 2 is a generally schematic, cross-sectional view of an assembly of fibers wherein relative positioning of the fibers according to the present inventive concept of forming fiber optical conduit is illustrated.
Figure 3:
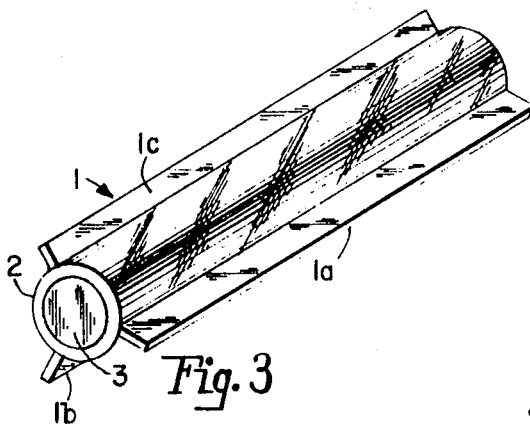
FIG. 3 is a perspective view of a fiber of the type shown in FIGS. 1 and 2.

In carrying out the invention, individual fiber cores are clad with an optical cladding and acid leachable rods are fused to the exterior surface of the cladding. A core 3 of high refractive index material (FIGS. 1 and 3) is clad with optical cladding 2 of lower refractive index material and longitudinal rods $1a$, $1b$ and $1c$ are fused to this cladding in equispaced positions about the fiber. The fibers are then bundled together to form an assembly 5 such as that illustrated in FIG. 2, with air filling the interstitial voids. This assembly is heated and drawn whereby, with a soft cladding, bubbles that may form at fiber core/clad interfaces will merely push the respective claddings into the air filled interstices. Thus, a bubble in the cladding of one fiber will not create a depression in the core of an adjacent fiber. Thus, the assembly shown in FIG. 2, after heating and drawing results in a superior leachable multifiber bundle which may, in some cases be a multi-multifiber bundle should it be decided to use fibers which in themselves, each comprise a fused assembly of a plurality of individually clad fiber elements. Multifibers per se are well-known in the art.

The acid-soluble glass must next be removed from the intermediate portion of the drawn bundle to produce a flexible conduit. Accordingly, opposite ends of the drawn bundle are potted to enclose and maintain the geometrical patterning of individual fiber ends of the conduit. The potting fills air spaces between fibers before leaching. When an epoxy potting composition is used, the conduit is heated sufficiently to cause the epoxy to flow into the air spaces and then the entire end of the conduit is covered with the epoxy. This prevents etching of the outermost leachable glass rods as well as inner portions thereof which would otherwise tend to become leached by capillary action. Also, after leaching, these ends of the conduit may be polished without the polishing compound getting into spaces between the fibers.

After the application of epoxy, wax or other acid resistant material to the ends of the conduit, it is leached by immersion in acid. Using an acid-soluble glass for rods 1, $1a$ and $1b$ (FIGS. 1-3) consisting, for example, of about 45 percent $B_2O_3$, about 45 percent BaO and about 8 or 10 percent $La_2O_3$, etching may be accomplished with hydrochloric acid.

Such leaching, it has been found, tends to proceed radially rather than axially in prior art processes leaving a cone of fiber connecting glass adjacent potted ends of the bundles. This effect, which weakens the bundles is avoided by the present invention wherein leaching occurs axially in spaces between the fibers as well as radially. Furthermore, the leaching time is considerably reduced by practice of the present invention.

The acid leachable rods have been illustrated as being rectangular in cross-section but they may be circular or of any unlimited number of other cross-sectional shapes. The number of rods, also, is a matter of choice, as long as their respective fibers are maintained in spaced relationship with each other. Under certain conditions fibers which have two acid soluble rods fused to the cladding may be used. However, three or more rods (usually not more than six) provide the most effective assembly for processing according to principles of the present invention.

I claim:
1. A bundle of light-transmitting fibers comprising:
   a plurality of high refractive index fibers;
   an optical cladding or relatively low refractive index material surrounding and fused to each fiber;
   a plurality of equispaced rods fused longitudinally to the exterior surface of said cladding of each of said fibers; and
   the assembly of said fiber, cladding and rods in each case forming a light-conducting unit and said units being longitudinally juxtaposed in a bundle with said rods causing each of said clad fibers to become spaced from its neighbors by longitudinally extending air spaces disposed between corresponding claddings of said fibers.

2. A bundle according to claim 1 wherein said rods are rectangular in cross-section.

3. A bundle of light-transmitting fibers according to claim 1 wherein said equispaced rods of each of said units are three in number whereby each clad fiber is spaced from its neighbor by six of said rods.

4. A bundle of light-transmitting fibers according to claim 1 wherein said units are all fused together and the bundle is drawn to a reduced cross-sectional size.

* * * * *